United States Patent
Saint-Etienne et al.

(10) Patent No.: US 10,193,830 B2
(45) Date of Patent: Jan. 29, 2019

(54) ONBOARD COMMUNICATION NETWORK OF A VEHICLE AND SUBSCRIBER OF SUCH A COMMUNICATION NETWORK

(71) Applicants: AIRBUS OPERATIONS (S.A.S.), Toulouse (FR); AIRBUS (S.A.S.), Toulouse (FR)

(72) Inventors: Jean-François Saint-Etienne, Cugnaux (FR); Juan Lopez, Grenade (FR)

(73) Assignees: AIRBUS OPERATIONS (S.A.S.), Toulouse (FR); AIRBUS (S.A.S.), Blagnac (FR)

( * ) Notice: Subject to any disclaimer, the term of this patent is extended or adjusted under 35 U.S.C. 154(b) by 137 days.

(21) Appl. No.: 15/376,606

(22) Filed: Dec. 12, 2016

(65) Prior Publication Data

US 2017/0171112 A1  Jun. 15, 2017

(30) Foreign Application Priority Data

Dec. 14, 2015  (FR) ...................................... 15 62295

(51) Int. Cl.
*H04L 12/931* (2013.01)
*H04L 12/46* (2006.01)
(Continued)

(52) U.S. Cl.
CPC ...... *H04L 49/351* (2013.01); *H04L 12/40006* (2013.01); *H04L 12/4625* (2013.01);
(Continued)

(58) Field of Classification Search
CPC .............. H04L 49/351; H04L 12/4625; H04L 12/40006; H04L 12/4641; H04L 49/30;
(Continued)

(56) References Cited

U.S. PATENT DOCUMENTS

| 7,352,744 B2 | 4/2008 | Saint Etienne et al. |
| 7,395,330 B2 | 7/2008 | Saint Etienne et al. |

(Continued)

FOREIGN PATENT DOCUMENTS

| EP | 1 309 130 A1 | 5/2003 |
| EP | 1 309 140 A1 | 5/2003 |

OTHER PUBLICATIONS

French Search Report for Application No. 1562295 dated Aug. 3, 2016.

*Primary Examiner* — Jackie Zuniga Abad

(74) *Attorney, Agent, or Firm* — Jenkins, Wilson, Taylor & Hunt, P.A.

(57) ABSTRACT

A subscriber of a deterministic Ethernet communication network using virtual links including a first receiver, a first transmitter, a first memory to record a configuration table relating to a set of virtual links that the subscriber can receive and/or retransmit. A processing unit is configured to implement at least one application, a reception function to receive data frames received by the first receiver, to accept the reception only of the frames corresponding to virtual links belonging to the set of virtual links and to transmit these frames to a sorting function to transmit the data frames received to the application and/or to a transmission function to dispatch the data frames received to the first transmitter while complying with Bandwidth Allocation Gap (BAG) constraints associated with the corresponding virtual links.

16 Claims, 6 Drawing Sheets

(51) Int. Cl.
*H04L 12/933* (2013.01)
*H04L 12/935* (2013.01)
*H04L 29/08* (2006.01)
*H04L 12/40* (2006.01)

(52) U.S. Cl.
CPC .......... *H04L 12/4641* (2013.01); *H04L 49/15* (2013.01); *H04L 49/30* (2013.01); *H04L 67/12* (2013.01); *H04L 2012/4028* (2013.01)

(58) Field of Classification Search
CPC .. H04L 49/15; H04L 67/12; H04L 2012/4028
See application file for complete search history.

(56) References Cited

U.S. PATENT DOCUMENTS

2010/0284313 A1* 11/2010 Monnier ............... H04L 49/208
 370/294
2012/0250694 A1* 10/2012 Hall ........................ H04L 47/22
 370/400

\* cited by examiner

ONBOARD COMMUNICATION NETWORK OF A VEHICLE AND SUBSCRIBER OF SUCH A COMMUNICATION NETWORK

CROSS-REFERENCE TO RELATED APPLICATION

This application claims the benefit of and priority to French patent application number 15 62295 filed on Dec. 14, 2015, the entire disclosure of which is incorporated by reference herein.

TECHNICAL FIELD

The disclosure herein relates to the field of communication networks and more particularly to communication networks onboard aircraft.

BACKGROUND

Aircraft generally comprise one or more onboard communication networks designed to allow communications between onboard devices, particularly onboard computers. In order to satisfy the regulatory requirements in regard to aircraft certification, an onboard communication network must be deterministic, that is to say that it must allow transmission of information from a sender device that is a subscriber to this communication network to one or more receiver devices that are subscribers to this communication network, with a duration of transmission of less than a predetermined duration as well as a guarantee of no information loss through the network. The ARINC 664 part 7 standard defines a deterministic onboard avionics communication network, based on a full-duplex switched Ethernet technology. Such a network may for example correspond to an AFDX® communication network. In a network in accordance with the ARINC 664 part 7 standard, each device is linked to a switch of the network and the communications between the various devices follow virtual links predefined during network definition and configuration. A virtual link is defined between a sender device and one or more receiver devices, via one or more switches of the network. Each virtual link follows a determined path in the network. A bandwidth is allocated to each virtual link and the routing of the various virtual links of the network is carried out in such a way that the sum of the bandwidths allocated to the virtual links following one and the same physical connection does not exceed the bandwidth supported by the physical connection. This is necessary in order to guarantee the determinism of the network. When a sender device that is a subscriber to the communication network wishes to send information to one or more receiver devices, it transmits this information in data frames on a virtual link of which this (or these) receiver device(s) is a recipient (are recipients). The dispatching of the data frames by the sender device is carried out while complying with constraints of temporal shaping (known as "traffic shaping") of each virtual link. For a given virtual link, these constraints correspond in particular to a time interval between two successive dispatches of data packets on the virtual link, these data packets corresponding to sets of data frames. This time interval is usually known as a BAG ("Bandwidth Allocation Gap"). A BAG is defined for each virtual link during the design of the communication network. When a virtual link passes through a switch, this switch receives, on a first physical connection, data frames corresponding to this virtual link and it retransmits these data frames on a second physical connection. The retransmission, on the second physical connection, of the data frames corresponding to the various virtual links sharing this second physical connection is carried out in an asynchronous manner, as a function of the reception of the various data frames by the switch. For a given virtual link, this results in a phenomenon of "Jitter" corresponding to a temporal offset, with respect to the BAG defined for this virtual link, between successive dispatches of data packets on this virtual link by the switch. Each switch through which the virtual link passes has the effect of increasing the Jitter phenomenon, the temporal offsets due to the various switches passed through possibly being aggregated. During the reception of the virtual link by a receiver subscriber, this receiver subscriber implements a function (known as "traffic policing") which carries out in particular a temporal check of the data packets received on the virtual link. This function checks in particular that the Jitter is less than a maximum value of Jitter permitted for the virtual link. Indeed, the network being a deterministic network, the value of the Jitter must always be less than this permitted maximum value of Jitter. During a step of demonstrating the determinism of the communication network, it is necessary to evaluate a maximum value of Jitter during the reception of each virtual link by a receiver subscriber, so as to check whether this maximum Jitter value is much less than the maximum value of Jitter permitted for this virtual link. The higher the number of virtual links and the higher the number of switches passed through by virtual links, the more complex is this demonstration. This demonstration provides furthermore for the computation, for each virtual link, of a transmission time on the virtual link between the sender subscriber and each receiver subscriber. This computation is complex having regard to the Jitter caused by passing through the various switches.

All the communications between devices are defined in advance, by defining the virtual links, so as to allow configuration of the switches: each switch comprises a configuration table dependent on the virtual links passing via this switch. The configuration of each switch is downloaded to the latter before its use. A switch generally comprises a significant number of communication ports, for example 24 ports for certain switches. Provision is also made for a redundancy of the switches so as to prevent a fault with a switch from giving rise to unavailability of the communications between certain devices: the communication network is duplicated on two sets of switches whose switches are interlinked in a similar manner. Each subscriber of the communication network is hooked up on the one hand to a switch of a first of the two sets of switches and on the other hand to the corresponding switch of the other set of switches. A modern aircraft can thus comprise a high number of switches, for example 14 switches on certain aircraft. This results in a weight, bulkiness and electrical consumption that it would be beneficial to reduce in order to improve the performance of the aircraft.

SUMMARY

An aim of the disclosure herein is in particular to afford a solution to these problems. It relates to a subscriber of an onboard communication network of a vehicle, the communication network being a deterministic Ethernet network using virtual links with each of which is associated a constraint relating to a time interval between two successive dispatches of data packets on the virtual link, the so-called BAG constraint.

This subscriber is noteworthy in that it comprises:
- at least one first receiver of a communication port compatible with the communication network;
- at least one first transmitter of a communication port compatible with the communication network;
- at least one first memory devised to record a configuration table relating to a set of virtual links that the subscriber can receive and/or retransmit; and
- a processing unit configured to implement:
  - at least one application able to receive information originating from the communication network and/or to transmit information to the communication network;
  - a sorting function;
  - a reception function configured to receive data frames received by the first receiver, to extract a virtual link identifier corresponding to each data frame received, to compare this identifier with identifiers of virtual links belonging to the configuration table, to accept reception only of the data frames corresponding to virtual links belonging to the set of virtual links and to transmit these data frames to the sorting function; and
  - a transmission function comprising a set of transmission queues, in such a way that with each of the virtual links of the set of virtual links is associated a specific queue belonging to the set of transmission queues, the transmission function being configured to receive data frames originating from the sorting function, to insert each of the data frames into the transmission queue associated with the virtual link corresponding to this data frame and to dispatch to the first transmitter the data frames arising from the various transmission queues while complying with the BAG constraints associated with the corresponding virtual links,
- the sorting function being configured to receive the data frames transmitted by the reception function and to transmit each of the data frames to the application and/or to the transmission function as a function of information contained in the configuration table for the virtual link corresponding to this data frame.

Thus, given that the first transmitter can retransmit data frames received by the first receiver, the subscriber can form part of a communication network not requiring any switch: the virtual links conveying data frames between a sender subscriber and a receiver subscriber can pass via one or more intermediate subscribers. This makes it possible to avoid the drawbacks related to the use of switches in a communication network. Moreover, given that the transmission function transmits the data frames on the various virtual links while complying with the BAG constraints corresponding to these virtual links ("traffic shaping" function), there is no cumulative effect on the Jitter when a data frame travels around the communication network, on a virtual link between a sender subscriber and a receiver subscriber. This makes it possible to facilitate the demonstration of determinism of the communication network. The computation of a transmission time on the virtual link between the sender subscriber and the receiver subscriber is simplified: it corresponds to the sum of the latency times (transit times) of the subscribers via which the virtual link between the sender subscriber and the receiver subscriber passes.

According to particular embodiments that may be taken into account in isolation or in combination:
- the subscriber is configured to communicate on the communication network according to a communication protocol compatible with the ARINC 664 part 7 standard;
- the sorting function is configured to receive data frames transmitted by the application and to transmit each of the data frames to the transmission function;
- the subscriber further comprises a second receiver of a communication port compatible with the communication network and a second transmitter of a communication port compatible with the communication network and:
- the reception function is configured further to receive data frames received by the second receiver, to extract a virtual link identifier corresponding to each frame received, to compare this identifier with identifiers of virtual links belonging to the configuration table, to accept the reception only of the frames corresponding to virtual links belonging to the set of virtual links and to transmit these frames to the sorting function; and
- the transmission function is configured to dispatch the data frames arising from the various transmission queues, both to the first transmitter and to the second transmitter, while complying with the BAG constraints associated with the corresponding virtual links.

In an advantageous manner, when the subscriber comprises the second receiver and the second transmitter, the reception function is configured to extract an identifier corresponding to each frame received, to check whether this identifier is already recorded in a second memory of the subscriber, to accept the frame received only if the identifier is not recorded in the second memory and to record the identifier in the second memory. This makes it possible to use the second transmitter and the second receiver to achieve a redundancy of the communications.

The disclosure herein also relates to an onboard communication network of a vehicle, the communication network being a deterministic Ethernet network using virtual links. This communication network is noteworthy in that it comprises a set of subscribers such as aforementioned.

According to a first variant, the subscribers of the set of subscribers are interlinked according to a linear topology.

According to a second variant, the subscribers of the set of subscribers are interlinked according to a circular topology.

According to a first embodiment of the second variant, when the subscribers of the set of subscribers comprise a second receiver and a second transmitter, the set of subscribers comprising at least a first, a second, a third, a fourth and a fifth subscribers, the first subscriber is linked to the other subscribers of the set of subscribers in such a way that the first receiver of the first subscriber is linked to the first sender of the second subscriber, the first sender of the first subscriber is linked to the first receiver of the third subscriber, the second receiver of the first subscriber is linked to the second sender of the fourth subscriber and the second sender of the first subscriber is linked to the second receiver of the fifth subscriber. In an advantageous manner, furthermore, the first receiver of the second subscriber is linked to the first sender of the fourth subscriber and the first sender of the third subscriber is linked to the first receiver of the fifth subscriber.

According to a second embodiment of the second variant, when the subscribers of the set of subscribers comprise a second receiver and a second transmitter, the set of subscribers comprising at least a first, a second and a third subscribers, the first subscriber is linked to the other subscribers of the set of subscribers in such a way that the first receiver of the first subscriber is linked to the first sender of the second subscriber, the first sender of the first subscriber is linked to the first receiver of the third subscriber, the second receiver of the first subscriber is linked to the second sender of the third subscriber and the second sender of the first subscriber is linked to the second receiver of the second subscriber.

According to a particular embodiment, the communication network further comprises at least one switch, at least one subscriber of the set of subscribers being linked to this at least one switch.

The disclosure herein also relates to an aircraft comprising a communication network such as aforementioned.

BRIEF DESCRIPTION OF THE DRAWINGS

The disclosure herein will be better understood on reading the description which follows and on examining the appended figures.

DETAILED DESCRIPTION

Figure 1:
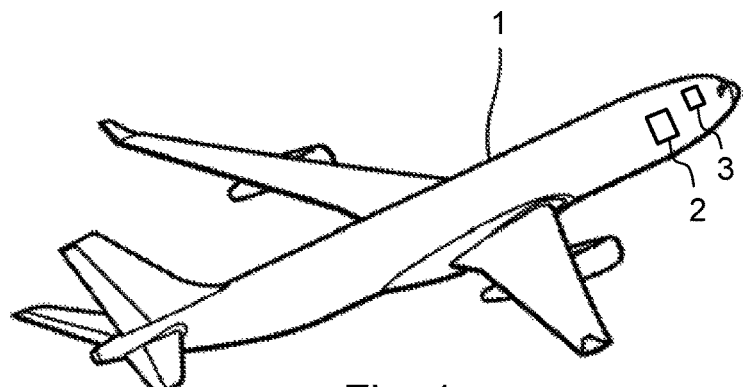
FIG. 1 illustrates in a simplified manner an aircraft comprising a communication network.
Figure 2:
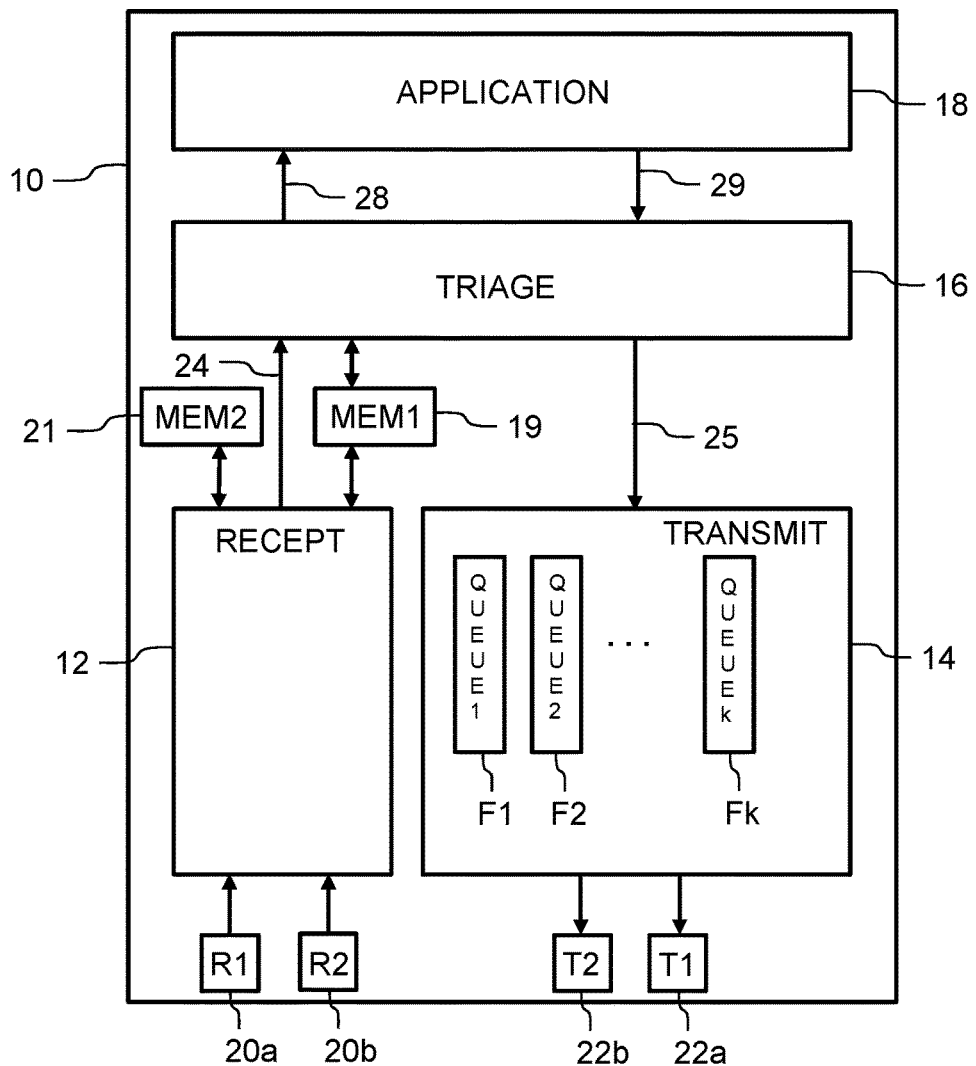
FIG. 2 represents in a schematic manner the functional architecture of a subscriber of a communication network, in accordance with an embodiment of the disclosure herein.

The subscriber 10 represented in FIG. 2 is a subscriber of an onboard communication network of a vehicle, the communication network being a deterministic Ethernet network using virtual links with each of which is associated a BAG constraint. This subscriber comprises a first receiver 20a (labeled R1 in the figure) of a communication port compatible with the communication network, as well as a first transmitter 22a (labeled T1 in the figure) of a communication port compatible with the communication network. It also comprises a first memory 19 (labeled MEM1 in the figure). This first memory is devised to record a configuration table relating to a set of virtual links that the subscriber can receive and/or retransmit. The configuration table comprises a list of the virtual links that the subscriber can receive and/or retransmit, this list comprising a set of information for each virtual link that it comprises: for example an identifier of the virtual link, such as its index number, and information indicating whether the subscriber 10 is receiver of the virtual link and/or whether the virtual link must be retransmitted by the subscriber 10. The subscriber 10 also comprises a reception function 12 (labeled RECEPT in the figure), a transmission function 14 (labeled TRANSMIT in the figure), a sorting function 16 and at least one application 18. The reception function, the transmission function, the sorting function and the application may for example be implemented in a software-based manner by a processing unit, such as a microprocessor or a microcontroller, of the subscriber 10. The subscriber 10 can in particular correspond to a computer of the vehicle onboard which the communication network is embedded. In the particular case in which the vehicle is an aircraft, this computer can be a computer dedicated to a particular function of the aircraft: it may for example correspond to a flight management computer of FMS ("Flight Management System") type, to an aircraft flight control computer of FCS ("Flight Control System") type, to an aircraft alerts management computer of FWC ("Flight Warning System") type, to an aircraft centralized maintenance computer of CMS ("Centralized Maintenance System") type, etc. The at least one application 18 is then in charge of the implementation of the particular function of the aircraft. The computer can also be a modular avionics computer of IMA ("Integrated Modular Avionics") type able to host several functions of the aircraft. The at least one application 18 then corresponds to one of the functions of the aircraft, the computer corresponding to the subscriber 10 being able to comprise as many applications 18 as functions hosted by this computer. Such a computer, be it of dedicated type or of IMA type, can in particular be located in an avionics bay 2 of an aircraft 1 such as represented in FIG. 1. This avionics bay 2 is generally located in proximity to a cockpit 3 of the aircraft.

The sorting function 16 is linked at input to the reception function 12 by a connection 24. The application 18 is linked at input to the sorting function 16 by a connection 28. The sorting function 16 is linked at input to the application 18 by a connection 29. The transmission function 14 is linked at input to the sorting function 16 by a connection 25. The connections 24, 28, 29 and 25 are not necessarily physical connections. They can in particular correspond to any procedure for transmitting information between functions inside a computer (common-memory sharing, queues, etc.). The transmission function 14 comprises a set of transmission queues F1, F2, . . . Fk (respectively labeled QUEUE1, QUEUE 2, QUEUEk in the figure), which are able to be each associated with a distinct virtual link.

In operation, when a data frame is received by the first receiver 20a of the subscriber 10, the reception function 12 receives the data frame and it extracts a virtual link identifier corresponding to this frame. This identifier may for example correspond to an index number of the virtual link. The reception function compares this identifier with identifiers of virtual links belonging to the configuration table recorded in the first memory 19. If the identifier corresponds to a virtual link belonging to the configuration table, then the reception function accepts the reception of the data frame since this is a virtual link whose subscriber 10 is receiver and/or that the subscriber 10 must retransmit. The reception function then transmits this data frame to the sorting function 16 through the connection 24. In the converse case, the subscriber 10 is not receiver of the virtual link and it must not retransmit it: consequently, the reception function rejects the data frame.

When the sorting function receives a data frame originating from the reception function, it checks the information contained in the configuration table for the virtual link corresponding to the data frame. If this is a virtual link whose subscriber 10 is receiver, the sorting function transmits the data frame to the application 18 through the connection 28. If this is a virtual link that the subscriber 10 must retransmit, the sorting function transmits the data frame to the transmission function through the connection 25. Moreover, the application 18 may wish to send data frames on the communication network, on virtual links whose subscriber 10 is sender. Accordingly, the application 18 transmits the corresponding data frames to the sorting function through the connection 29 and the sorting function transmits these data frames to the transmission function through the connection 25.

When the transmission function 14 receives a data frame originating from the sorting function through the connection 25, it inserts this data frame into one of the transmission queues F1, F2, Fk associated with the virtual link corresponding to this data frame. The transmission function dispatches to the first transmitter 22a the data frames arising from the various transmission queues F1, F2, Fk while complying with the BAG constraints associated with the virtual links corresponding to these transmission queues. The first transmitter transmits these data frames on the communication network. The transmission function thus carries out a temporal shaping of the data traffic sent by the transmitter 22a ("traffic shaping" function). This temporal shaping is carried out in a manner similar to that carried out in a usual manner in the subscribers of a deterministic switched Ethernet communication network using virtual links, when these subscribers send data frames on these virtual links. Thus, by virtue of the transmission function 14, the temporal shaping, and therefore the compliance with the BAG constraints, relates not only to the data frames sent initially by the subscriber 10 (data frames originating from the application 18), but also to the data frames received by the first receiver 20a and retransmitted by the subscriber 10 (as a function of the configuration table recorded in the first memory 19). This makes it possible to reduce the Jitter on each virtual link when this virtual link is retransmitted by a subscriber such as the subscriber 10 (instead of being retransmitted by a switch). Moreover, this also makes it possible to facilitate the demonstration of the determinism of the communication network since the virtual link is reshaped in a temporal manner each time that it is received and retransmitted by a subscriber, such as the subscriber 10, of the communication network.

In a particular embodiment, the subscriber 10 further comprises a second receiver 20b (labeled R2 in the figure) of a communication port compatible with the communication network and a second transmitter 22b (labeled T2 in the figure) of a communication port compatible with the communication network. When a data frame is received by the second receiver 20b of the subscriber 10, the reception function 12 receives the data frame and either it transmits this data frame to the sorting function, or it rejects this data frame, in the same manner as for a data frame received by the first receiver 20a. The transmission function 14 dispatches the data frames arising from the various transmission queues F1, F2, . . . Fk both to the first transmitter 22a and to the second transmitter 22b, while complying with the BAG constraints associated with the virtual links corresponding to these transmission queues. The first transmitter and the second transmitter transmit these data frames on the communication network. In an advantageous manner, the subscriber 10 comprises a second memory 21 (labeled MEM2 in the figure) and the reception function 12 is further configured to extract an identifier corresponding to each frame received, to check whether this identifier is already recorded in the second memory 21, to transmit the data frame received to the sorting function only if the identifier is not recorded in the second memory and to record the identifier in the second memory. The identifier corresponding to each data frame can in particular correspond to a sequence number of the data frame on the virtual link considered. Such operation makes it possible to manage a redundant transmission of the data frames on the communication network: one and the same data frame of a virtual link being sent both by the first transmitter and by the second transmitter of a sender subscriber, this data frame is conveyed by several paths on the communication network (corresponding to various connections between the subscribers of the communication network). When a subscriber receives this data frame (whether this subscriber is receiver of the virtual link or only in charge of retransmitting the virtual link), the subscriber's reception function accepts only the first occurrence of the data frame, received by one of the first or second receivers of the subscriber. If the data frame is received a second time by the subscriber, in particular by the other of the first or second receivers, then this data frame is rejected by the reception function since it carries the same identifier as the data frame received previously and accepted.

Figure 3:
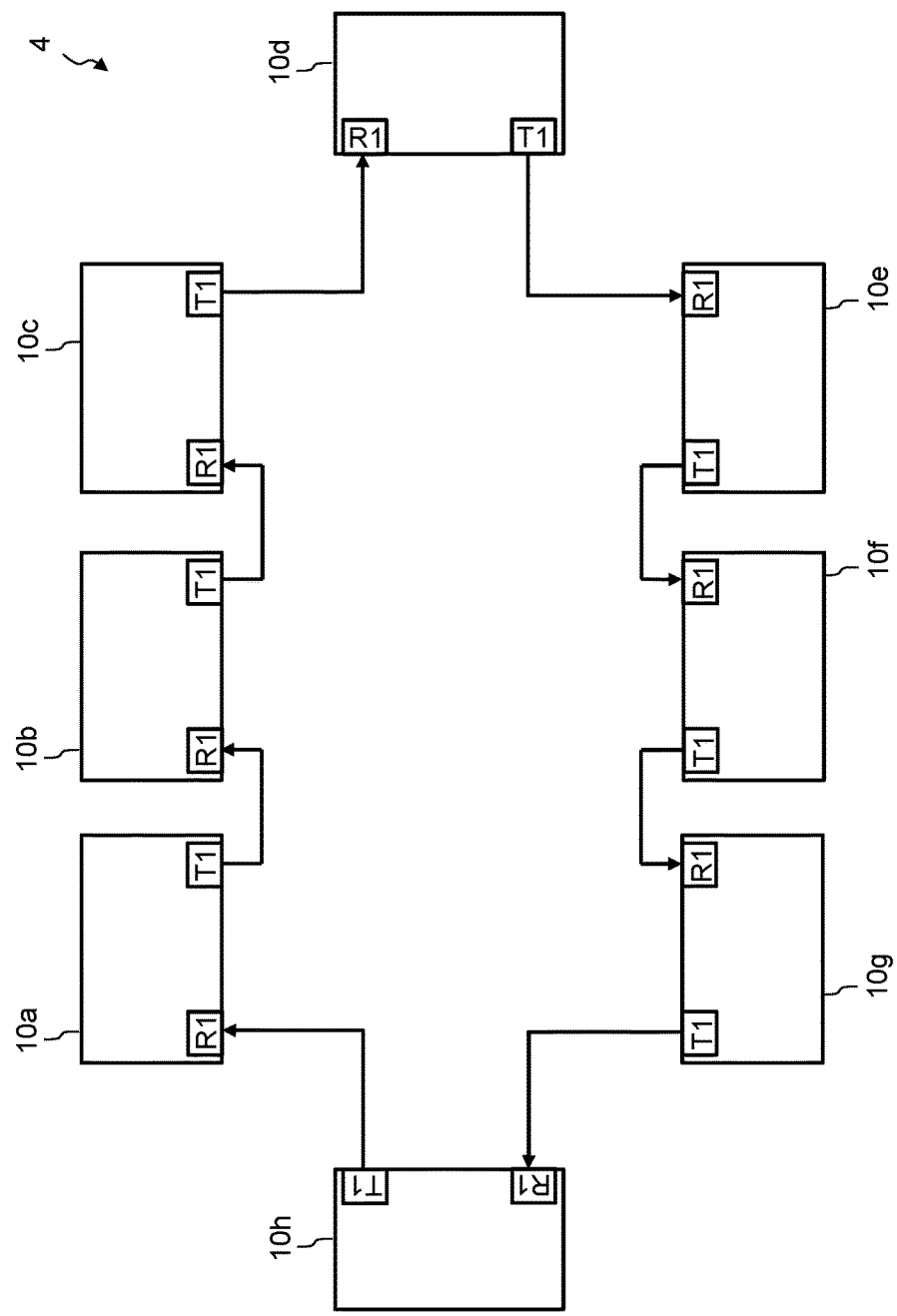
FIGS. 3, 4, 5, 6 and 7 represent various examples of communication networks in accordance with embodiments of the disclosure herein.

The communication network 4 represented in FIG. 3 comprises a set of subscribers 10a, 10b, . . . 10h each similar to the subscriber 10 described with reference to FIG. 2. The various subscribers of the set of subscribers are interlinked according to a circular network topology, that is to say a topology according to which the first transmitter (labeled T1) of each subscriber is linked to the first receiver (labeled R1) of another subscriber, termed the following subscriber, by a communication connection. This communication connection can be of wired type, of optical fiber type, etc. according to the communication technology of the communication network. A subscriber of the set of subscribers can thus send data frames to any of the other subscribers of the set of subscribers on a virtual link defined accordingly. For example, the subscriber 10a can send data frames to the subscriber 10e. Accordingly, a virtual link is defined between the subscriber 10a (sender) and the subscriber 10e (receiver). This virtual link passes through the subscribers 10b, 10c and 10d. The configuration table of each of the subscribers 10b, 10c and 10d is configured in such a way that the subscriber considered retransmits this virtual link. The configuration table of the subscriber 10e is configured in such a way that this subscriber is receiver of the virtual link. Although this example is described in the case of a single receiver subscriber, provision may be made for several receiver subscribers of the virtual link.

Figure 4:
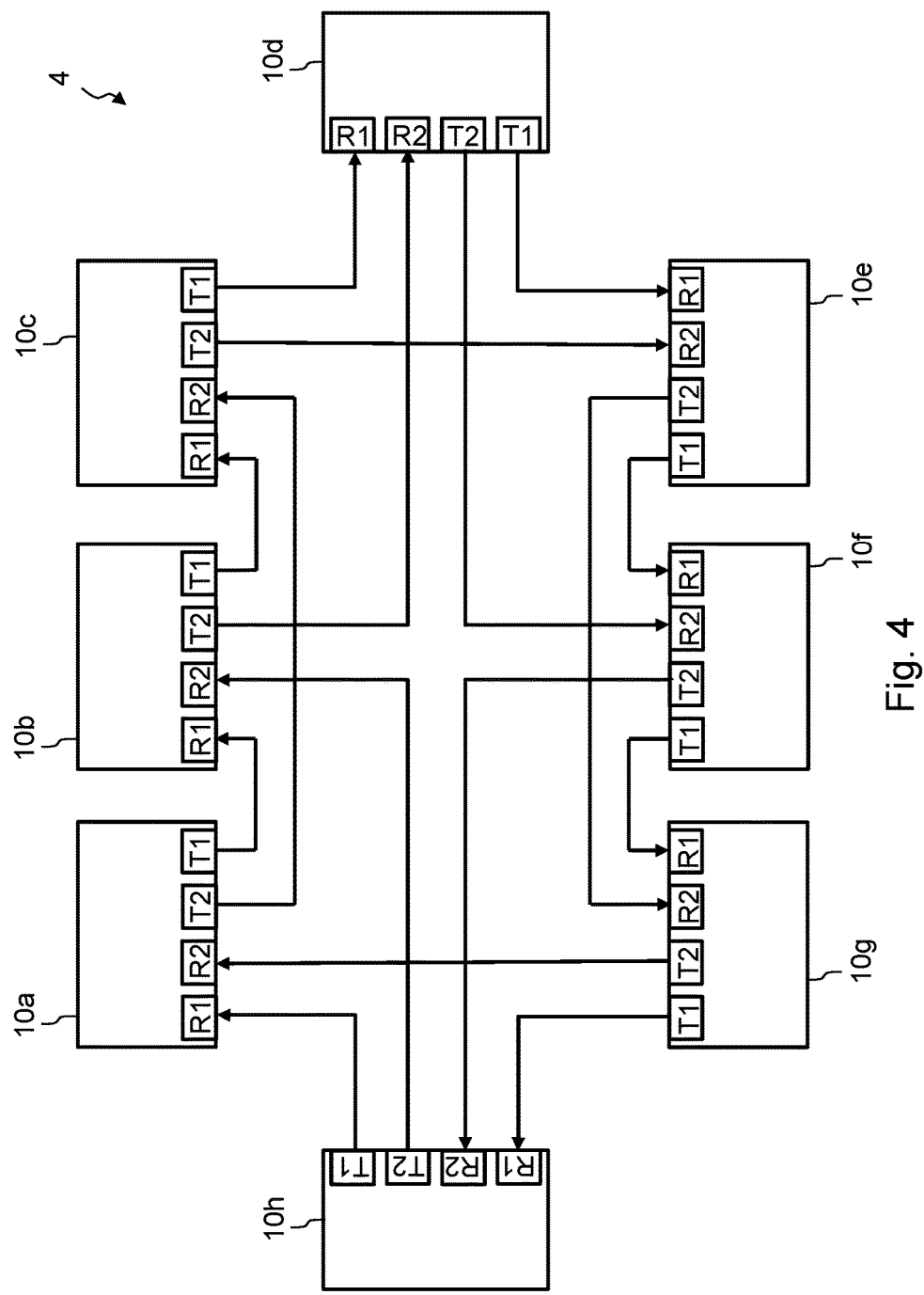

In the communication network represented in FIG. 4, each of the subscribers 10a, 10b, . . . 10h further comprises a second transmitter (labeled T2) and a second receiver (labeled R2). The connections between the first transmitters and the first receivers of the various subscribers are similar to those already described with reference to FIG. 3. Moreover, the second transmitter of each subscriber is linked to the second receiver of the subscriber following the following subscriber. For example, on considering the subscriber 10c, the following subscriber is the subscriber 10d and the subscriber following the subscriber 10d is the subscriber 10e. Thus, the first transmitter of the subscriber 10c is linked to the first receiver of the subscriber 10d and the second transmitter of the subscriber 10c is linked to the second receiver of the subscriber 10e. In a similar manner, on considering the first and the second receivers of the subscriber 10c, the first transmitter of the subscriber 10b is linked to the first receiver of the subscriber 10c and the second transmitter of the subscriber 10a is linked to the second receiver of the subscriber 10c. Such a configuration of the communication network makes it possible to ensure redundancy of the communications. Thus, for example, in the case of the aforementioned virtual link between the subscriber 10a (sender) and the subscriber 10e (receiver), even if the connection between the first transmitter of the subscriber 10b and the first receiver of the subscriber 10c is no longer operational, communications between the subscriber 10a and the subscriber 10e remain possible: the data frames corresponding to this virtual link also being transmitted by the second transmitter of the subscriber 10a, they are received by the second receiver of the subscriber 10c, thereby making it possible to alleviate a malfunction of the communication connection between the first transmitter of the subscriber 10b and the first receiver of the subscriber 10c. Moreover, the data frames corresponding to this virtual link that are received by the subscriber 10b are also transmitted by the second transmitter of the subscriber 10b to the second receiver of the subscriber 10d. Again this makes it possible to alleviate, for this virtual link, a malfunction of the communication connection between the first transmitter of the subscriber 10b and the first receiver of the subscriber 10c. This configuration of the communication network is also robust with respect to a fault with a subscriber of the communication network. Thus, in the case of the aforementioned virtual link, assuming for example that the subscriber 10c is faulty, the data frames corresponding to this virtual link that are received by the subscriber 10b also being transmitted by the second transmitter of the subscriber 10b to the second receiver of the subscriber 10d, communications on this virtual link are not interrupted. The connection between the second transmitter of the subscriber 10b and the second receiver of the subscriber 10d makes it possible to circumvent the faulty subscriber 10c.

Figure 5:
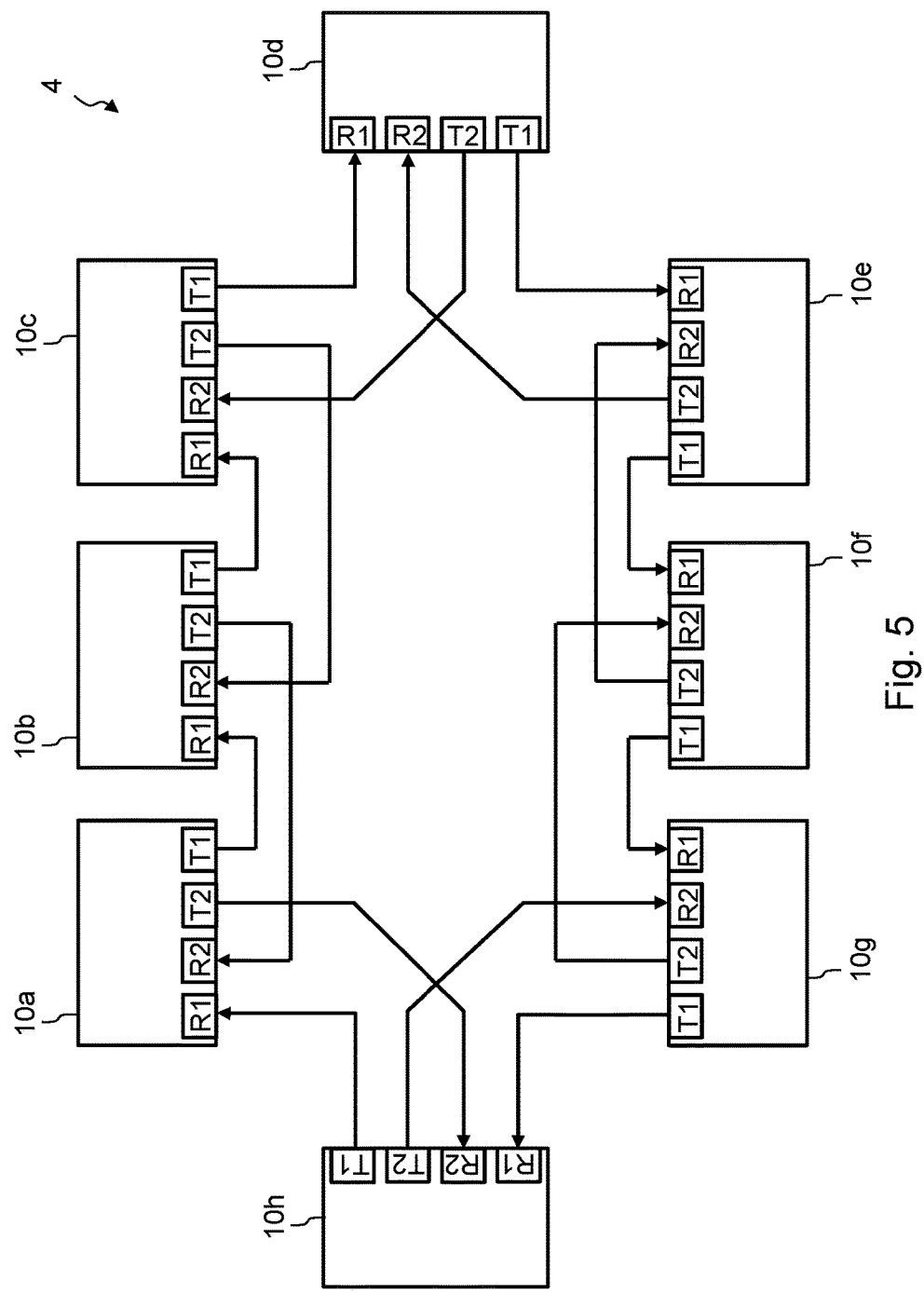

In the communication network represented in FIG. 5, each of the subscribers 10a, 10b, . . . 10h further comprises a second transmitter (labeled T2) and a second receiver (labeled R2). The connections between the first transmitters and the first receivers of the various subscribers are similar to those already described with reference to FIG. 3. Moreover, the second transmitter of each subscriber is linked to the second receiver of the preceding subscriber on the circular topology. The preceding subscriber of a subscriber considered is defined as being the subscriber whose first transmitter is linked to the first receiver of the subscriber considered. Thus, for example, the second transmitter of the subscriber 10b is linked to the second receiver of the subscriber 10a. As in the example of FIG. 4, such a configuration of the communication network makes it possible to ensure redundancy of the communications. It is accordingly appropriate to define a redundant virtual link of the virtual link considered, this redundant virtual link being defined on the circular topology oppositely directed to the virtual link considered and passing through the second transmitters and the second receivers of the subscribers. Thus, for example, in the case of the aforementioned virtual link between the subscriber 10a (sender) and the subscriber 10e (receiver), it is possible to define a redundant virtual link between the subscriber 10a and the subscriber 10e, this redundant virtual link passing through the subscribers 10h, 10g and 10f. Moreover, such a topology can allow shorter connections between a sender subscriber and a receiver subscriber. For example, when the subscriber 10a must dispatch data frames to the subscriber 10g, this topology allows a connection passing through the subscriber 10h. This connection is shorter than a connection that would pass through the subscribers 10b, 10c, 10d, 10e and 10f.

Figure 6:
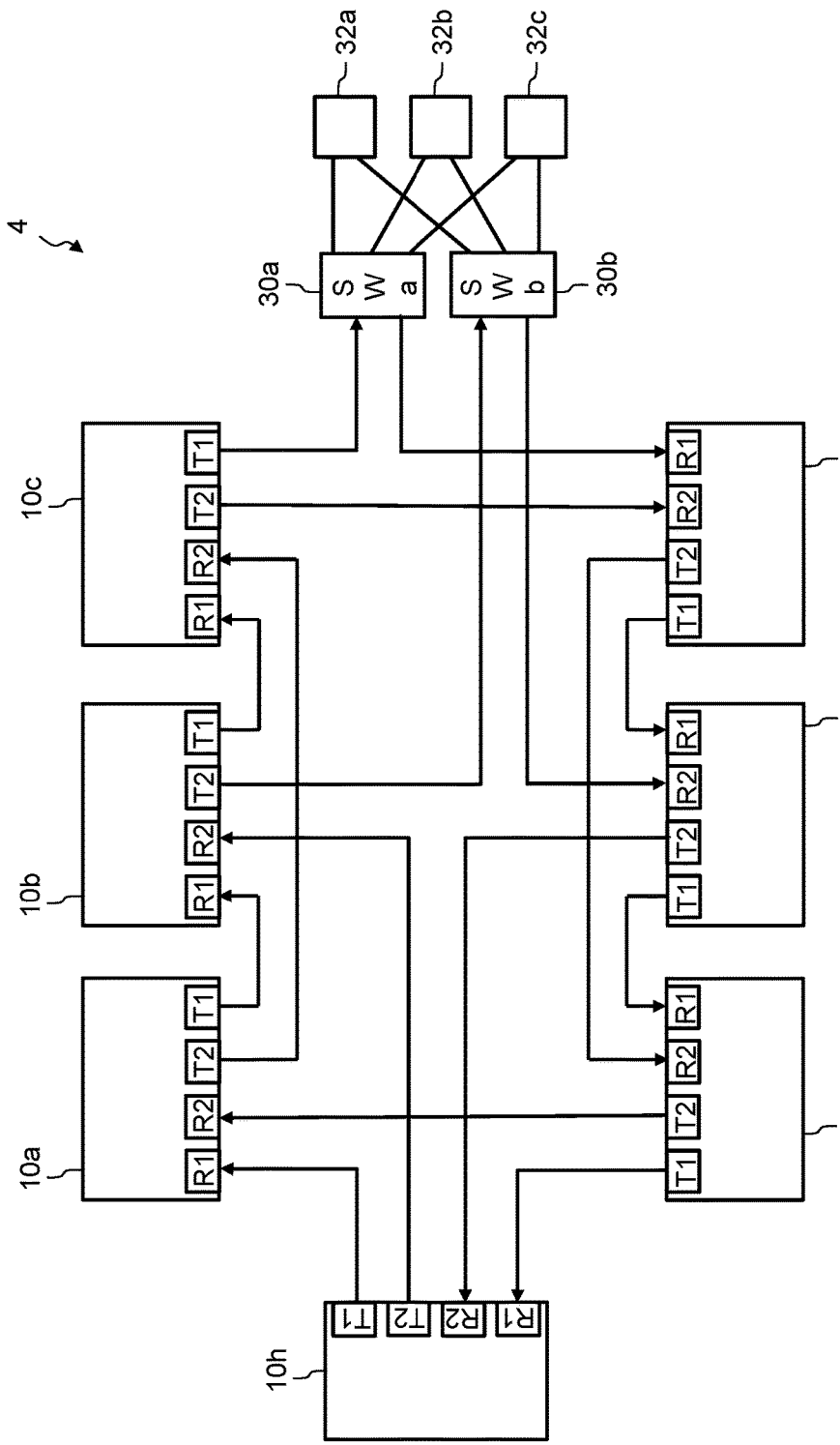

The communication network represented in FIG. 6 is similar to the communication network represented in FIG. 4, except that the subscriber 10d is replaced with two redundant switches 30a and 30b (respectively labeled SWa and SWb) of a conventional deterministic switched Ethernet network.

Conventional subscribers 32a, 32b and 32c are linked to each of the two redundant switches. The communication network thus comprises two parts: a first part corresponding to a conventional network comprising the two redundant switches and the conventional subscribers 32a, 32b and 32c, and a second part comprising the set of subscribers 10a, 10b, 10c, 10e, 10f, 10g and 10h such as aforementioned, these subscribers of the set of subscribers communicating with one another without a switch. There is interoperability of the subscribers of the set of subscribers with the conventional subscribers. One and the same virtual link can for one part pass via subscribers of the set of subscribers and, for another part, pass via conventional redundant switches to (or from) one or more conventional subscribers.

Figure 7:
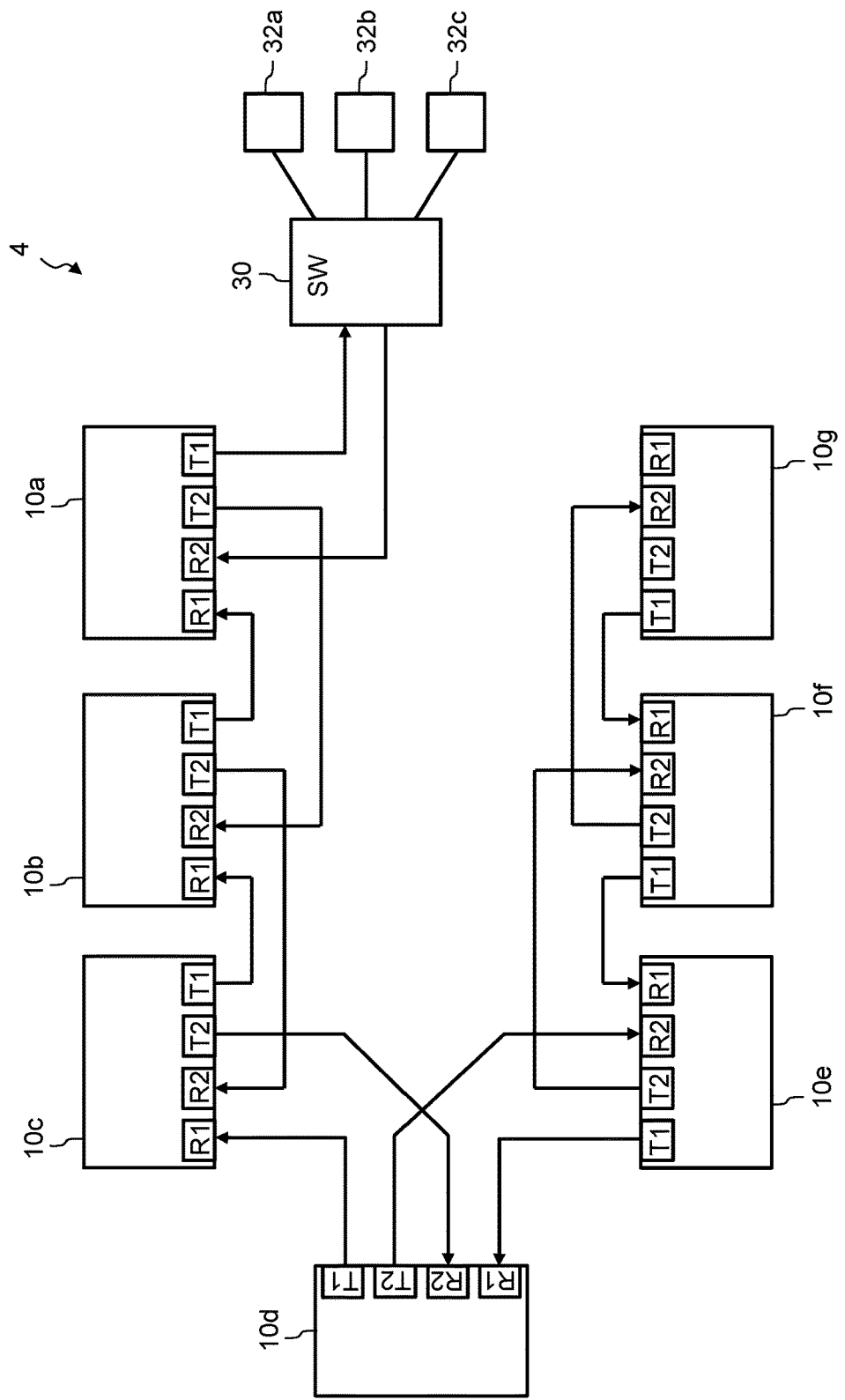

The communication network represented in FIG. 7 comprises a set of subscribers 10a, 10b, 10g each similar to the subscriber 10 described with reference to FIG. 2. The various subscribers of the set of subscribers are interlinked according to a linear network topology (known as a "daisy chain"). The communication connections between the various subscribers are such that the first transmitter of a subscriber is linked to the first receiver of the following subscriber and the second transmitter of a subscriber is linked to the second receiver of the preceding subscriber. This allows bidirectional communications between all the subscribers of the communication network. In an advantageous, although optional manner, a subscriber situated at an end of the linear topology is linked to a switch of a conventional deterministic switched Ethernet network. Thus, as represented in FIG. 7, the subscriber 10a is linked to a switch 30 (labeled SW in the figure). Conventional subscribers 32a, 32b and 32c are linked to the switch 30. In such a case, the linear topology may for example be used to hook up at lesser cost a set of sensors (corresponding to the subscribers 10a, 10b, . . . 10g) to the conventional deterministic switched Ethernet network.

In a particular embodiment, the subscribers are configured to communicate on the communication network according to a communication protocol compatible with the ARINC 664 part 7 standard.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A subscriber of an onboard communication network of a vehicle, the communication network being a deterministic Ethernet network using virtual links with each of which is associated a constraint relating to a time interval between two successive dispatches of data packets on the virtual link, referred to as a Bandwidth Allocation Gap (BAG) constraint, the subscriber comprising:
at least one first receiver of a communication port compatible with the communication network;
at least one first transmitter of a communication port compatible with the communication network;
at least one first memory to record a configuration table relating to a set of virtual links that the subscriber can receive and/or retransmit; and
a processor configured to implement:
at least one application able to receive information originating from the communication network and/or to transmit information to the communication network;
a sorting function;
a reception function configured to receive data frames received by the first receiver, to extract a virtual link identifier corresponding to each data frame received, to compare this identifier with identifiers of virtual links belonging to the configuration table, to accept reception only of the data frames corresponding to virtual links belonging to the set of virtual links and to transmit these data frames to the sorting function; and
a transmission function comprising a set of transmission queues, wherein each of the virtual links of the set of virtual links is associated with a specific queue belonging to the set of transmission queues, the transmission function being configured to receive data frames originating from the sorting function, to insert each of the data frames into the transmission queue associated with the virtual link corresponding to this data frame and to dispatch to the first transmitter the data frames arising from the various transmission queues while complying with the BAG constraints associated with the corresponding virtual links,
the sorting function being configured to receive the data frames transmitted by the reception function and to transmit each of the data frames to the application and/or to the transmission function as a function of information contained in the configuration table for the virtual link corresponding to this data frame, and the subscriber further comprising a second receiver of a communication port compatible with the communication network and a second transmitter of a communication port compatible with the communication network, wherein the subscriber is coupled to a set of subscribers each comprising first and second transmitters and first and second receivers, wherein the set of subscribers comprises at least a first, a second, a third, a fourth and a fifth subscribers, the first subscriber being linked to the other subscribers of the set of subscribers such that the first receiver of the first subscriber is linked to the first sender of the second subscriber, the first sender of the first subscriber is linked to the first receiver of the third subscriber, the second receiver of the first subscriber is linked to the second sender of the fourth subscriber and the second sender of the first subscriber is linked to the second receiver of the fifth subscriber.

2. The subscriber as claimed in claim 1, wherein the subscriber is configured to communicate on the communication network according to a communication protocol compatible with (Aeronautical Radio, Incorporated) ARINC 664 part 7 standard.

3. The subscriber as claimed in claim 2, wherein the sorting function is configured to receive data frames transmitted by the application and to transmit each of the data frames to the transmission function.

4. The subscriber as claimed in claim 1, wherein:
the reception function is configured further to receive data frames received by the second receiver, to extract a virtual link identifier corresponding to each data frame received, to compare this identifier with identifiers of virtual links belonging to the configuration table, to accept reception only of the data frames corresponding to virtual links belonging to the set of virtual links and to transmit these data frames to the sorting function; and
the transmission function is configured to dispatch the data frames arising from the various transmission queues, both to the first transmitter and to the second transmitter, while complying with the BAG constraints associated with the corresponding virtual links.

5. The subscriber as claimed in claim 4, wherein the reception function is configured to extract an identifier corresponding to each data frame received, to check whether this identifier is already recorded in a second memory of the subscriber, to accept the data frame received only if the identifier is not recorded in the second memory and to record the identifier in the second memory.

6. An onboard communication network of a vehicle, the communication network being a deterministic Ethernet network using virtual links, comprising a set of subscribers: wherein each subscriber of the set of subscribers comprises a subscriber of an onboard communication network of a vehicle, the communication network being a deterministic Ethernet network using virtual links with each of which is associated a constraint relating to a time interval between two successive dispatches of data packets on the virtual link, referred to as a Bandwidth Allocation Gap (BAG) constraint, the subscriber comprising:
at least one first receiver of a communication port compatible with the communication network;
at least one first transmitter of a communication port compatible with the communication network;
at least one first memory to record a configuration table relating to a set of virtual links that the subscriber can receive and/or retransmit; and
a processor configured to implement:
at least one application able to receive information originating from the communication network and/or to transmit information to the communication network;
a sorting function;
a reception function configured to receive data frames received by the first receiver, to extract a virtual link identifier corresponding to each data frame received, to compare this identifier with identifiers of virtual links belonging to the configuration table, to accept reception only of the data frames corresponding to virtual links belonging to the set of virtual links and to transmit these data frames to the sorting function; and
a transmission function comprising a set of transmission queues, wherein each of the virtual links of the set of virtual links is associated with a specific queue belonging to the set of transmission queues, the transmission function being configured to receive data frames originating from the sorting function, to insert each of the data frames into the transmission queue associated with the virtual link corresponding to this data frame and to dispatch to the first transmitter the data frames arising from the various transmission queues while complying with the BAG constraints associated with the corresponding virtual links, the sorting function being configured to receive the data frames transmitted by the reception function and to transmit each of the data frames to the application and/or to the transmission function as a function of information contained in the configuration table for the virtual link corresponding to this data frame, each subscriber of the communication network further comprising a second receiver of a communication port compatible with the communication network and a second transmitter of a communication port compatible with the communication network, and wherein the set of subscribers comprises at least a first, a second, a third, a fourth and a fifth subscribers, the first subscriber being linked to the other subscribers of the set of subscribers such that the first receiver of the first subscriber is linked to the first sender of the second subscriber, the first sender of the first subscriber is linked to the first receiver of the third subscriber, the second receiver of the first subscriber is linked to the second sender of the fourth subscriber and the second sender of the first subscriber is linked to the second receiver of the fifth subscriber.

7. The communication network as claimed in claim 6, wherein:

the reception function is configured further to receive data frames received by the second receiver, to extract a virtual link identifier corresponding to each data frame received, to compare this identifier with identifiers of virtual links belonging to the configuration table, to accept reception only of the data frames corresponding to virtual links belonging to the set of virtual links and to transmit these data frames to the sorting function; and the transmission function is configured to dispatch the data frames arising from the various transmission queues, both to the first transmitter and to the second transmitter, while complying with the BAG constraints associated with the corresponding virtual links; and wherein the subscribers of the set of subscribers are interlinked according to a linear topology.

8. The communication network as claimed in claim 7, wherein the reception function is configured to extract an identifier corresponding to each data frame received, to check whether this identifier is already recorded in a second memory of the subscriber, to accept the data frame received only if the identifier is not recorded in the second memory and to record the identifier in the second memory.

9. The communication network as claimed in claim 6, wherein the subscribers of the set of subscribers are interlinked according to a circular topology.

10. The communication network as claimed in claim 9, wherein:

the reception function is configured further to receive data frames received by the second receiver, to extract a virtual link identifier corresponding to each data frame received, to compare this identifier with identifiers of virtual links belonging to the configuration table, to accept reception only of the data frames corresponding to virtual links belonging to the set of virtual links and to transmit these data frames to the sorting function; and the transmission function is configured to dispatch the data frames arising from the various transmission queues, both to the first transmitter and to the second transmitter, while complying with the BAG constraints associated with the corresponding virtual links.

11. The communication network as claimed in claim 9, wherein the reception function is configured to extract an identifier corresponding to each data frame received, to check whether this identifier is already recorded in a second memory of the subscriber, to accept the data frame received only if the identifier is not recorded in the second memory and to record the identifier in the second memory.

12. The communication network as claimed in claim 11, wherein the first receiver of the second subscriber is linked to the first sender of the fourth subscriber and the first sender of the third subscriber is linked to the first receiver of the fifth subscriber.

13. The communication network as claimed in claim 10, wherein:

the reception function is configured further to receive data frames received by the second receiver, to extract a virtual link identifier corresponding to each data frame received, to compare this identifier with identifiers of virtual links belonging to the configuration table, to accept reception only of the data frames corresponding to virtual links belonging to the set of virtual links and to transmit these data frames to the sorting function; and the transmission function is configured to dispatch the data frames arising from the various transmission queues, both to the first transmitter and to the second transmitter, while complying with the BAG constraints associated with the corresponding virtual links.

14. The communication network as claimed in claim 13, wherein the reception function is configured to extract an identifier corresponding to each data frame received, to check whether this identifier is already recorded in a second memory of the subscriber, to accept the data frame received only if the identifier is not recorded in the second memory and to record the identifier in the second memory.

15. The communication network as claimed in claim 6, further comprising at least one switch, at least one subscriber of the set of subscribers being linked to this at least one switch.

16. An aircraft comprising a communication network as claimed in claim 6.

* * * * *